(12) United States Patent
Magnotta et al.

(10) Patent No.: US 7,747,241 B1
(45) Date of Patent: *Jun. 29, 2010

(54) PREPAID RESERVATION-BASED RATING SYSTEM

(75) Inventors: Michael Joseph Magnotta, Cincinnati, OH (US); Derron Keith Newland, Cincinnati, OH (US); Frank Clifford Perkins, Lake Mary, FL (US); Joseph DiFonzo, Lake Mary, FL (US)

(73) Assignee: Convergys CMG Utah, Salt Lake City, UT (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/013,816

(22) Filed: Jan. 14, 2008

Related U.S. Application Data

(63) Continuation of application No. 10/272,792, filed on Oct. 17, 2002, now Pat. No. 7,366,495, which is a continuation of application No. 09/886,812, filed on Jun. 21, 2001, now abandoned.

(51) Int. Cl.
*H04M 11/00* (2006.01)
(52) U.S. Cl. .................. 455/406; 455/405; 455/407; 455/408; 379/111; 379/112; 379/113; 379/114; 379/115; 725/1; 725/2; 725/3; 725/4; 725/5; 725/6; 725/7
(58) Field of Classification Search ................ 455/406, 455/408; 705/32; 725/1–8
See application file for complete search history.

(56) References Cited

OTHER PUBLICATIONS

Information Disclosure Statement dated Aug. 1, 2005 for U.S. Appl. No. 10/970,059.
Office Action dated Aug. 21, 2008 for U.S. Appl. No. 10/970,059.
Office Action dated Apr. 3, 2009 for U.S. Appl. No. 10/970,059.
U.S. Appl. No. 10/970,059, filed Oct. 20, 2004, Bobich et al.
Final Rejection dated Apr. 23, 2008 for U.S. Appl. No. 10/682,663.
Office Action dated Jun. 25, 2009 for U.S. Appl. No. 10/682,663.
U.S. Appl. No. 10/272,792, filed Oct. 17, 2002; Magnotta.
Information Disclosure Statement dated Mar. 3, 2003 for U.S. Appl. No. 10/272,792.
Information Disclosure Statement dated Apr. 6, 2005 for U.S. Appl. No. 10/272,792.
Office Action dated Nov. 29, 2005 for U.S. Appl. No. 10/272,792.
Office Action dated May 16, 2006 for U.S. Appl. No. 10/272,792.
Office Action dated Aug. 1, 2006 for U.S. Appl. No. 10/272,792.
Office Action dated Oct. 31, 2006 for U.S. Appl. No. 10/272,792.
U.S. Appl. No. 09/886,812, filed Jun. 21, 2001; Magnotta.
Information Disclosure Statement dated Sep. 11, 2002 for U.S. Appl. No. 09/886,812.

*Primary Examiner*—Lester Kincaid
*Assistant Examiner*—Charles Shedrick
(74) *Attorney, Agent, or Firm*—William S. Morriss; Frost Brown Todd LLC

(57) ABSTRACT

A billing system comprising servers, routers, and processors programmed to provide reservation based prepaid billing is disclosed. The billing system is also programmed to concurrently process multiple billing events on a single, prepaid subscriber account.

15 Claims, 1 Drawing Sheet

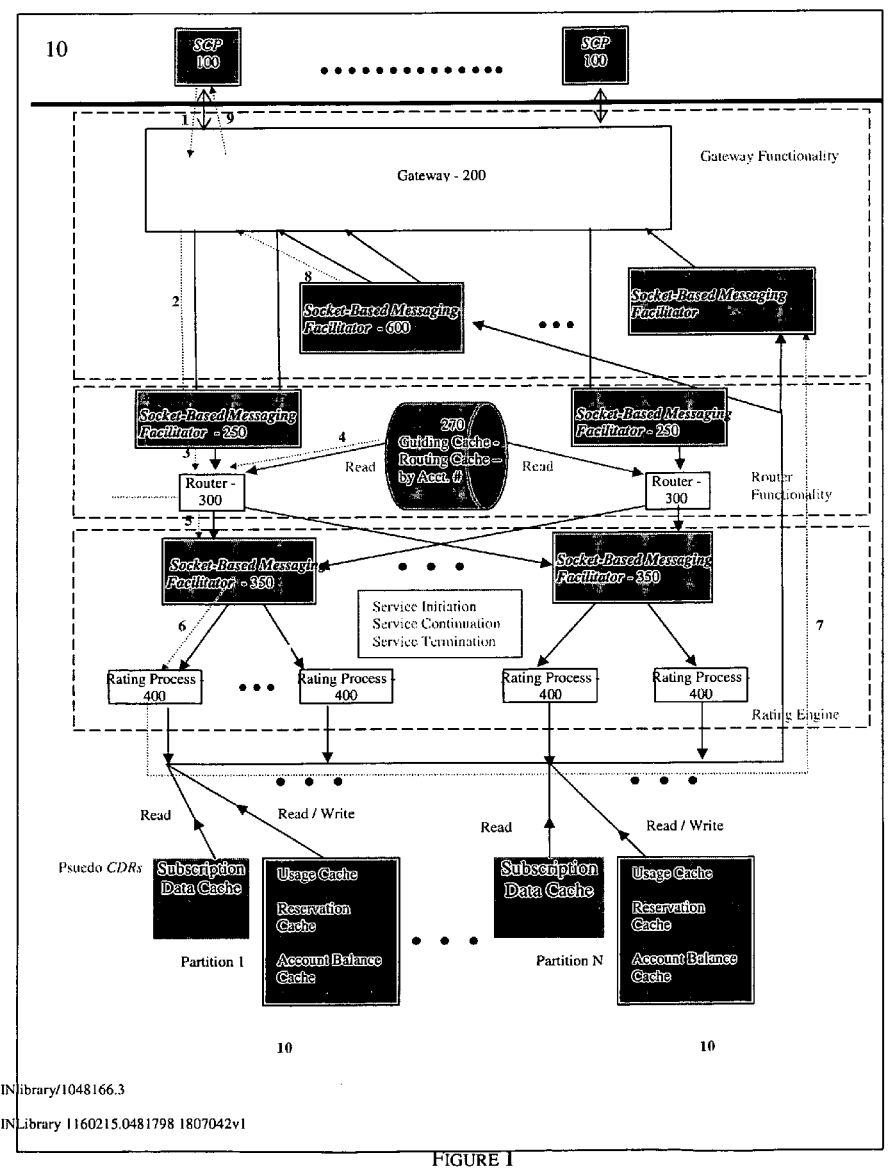
FIGURE I

PREPAID RESERVATION-BASED RATING SYSTEM

CROSS REFERENCE TO RELATED APPLICATIONS

This is a Continuation Application, which claims the priority of Non-Provisional patent application Ser. No. 09/886,812 filed on Jun. 21, 2001, and Non-Provisional patent application Ser. No. 10/272,792 filed on Oct. 17, 2002. Both applications are hereby incorporated by reference.

TECHNICAL FIELD

This invention relates to billing systems, and more particularly to a telecommunications billing system for prepaid accounts.

BACKGROUND

Commercial billing systems comprise postpaid and prepaid solutions. In a postpaid solution, the system will track any financial transactions (billing events), calculate the applicable charges for the billing event, and bill the subscriber for such charges at some future time. Because the subscriber is billed at a future date (thus allowing more time for processing), these systems have traditionally been more complex and more flexible than prepaid solutions.

In a prepaid system, the subscriber will pay a certain amount to the enterprise prior to using the service. Traditionally, prepaid solutions are less sophisticated than postpaid solutions. When a billing event is processed, the system will lock the entire balance of a user's account until the call is completed or torn down. Financial transactions (i.e., billing events), which occur against the account, are tracked in near real-time. At completion or tear down, a transaction is created to debit the Account Balance appropriately. In other words, the balance is updated after the transaction is complete. Therefore, current prepaid solutions do not charge the subscriber until the call is completed. But to be effective, prepaid solutions must update the Account Balance/Available Balance of a subscriber very close to the termination of a call. While this process has been relatively effective, several issues still persist. The enterprise wants to do everything possible to prevent a subscriber from incurring a debit balance. This is a particular issue in the mobile phone industry as more and more prepaid rental/disposable phones are utilized by persons who do not want to pay monthly fees for mobile access or by persons who are not approved for a mobile account because of credit problems.

More sophisticated systems will check the Account Balance before processing the billing event. Then, as the charges are being calculated in near real-time, these systems will compare the current charge to the Account Balance/Available Balance at predetermined intervals. If, during one of these "spot-checks," the current charges exceed the Available Balance, these systems will tear down the billing event. At least two issues still exist with even these sophisticated systems. First, there is a greater chance that the Available Balance will be exceeded with these systems, as it is impractical to check the balance every second of the transaction. Second, as more and more applications are offered over mobile devices (Internet access, e-mail, phone calls, etc.), systems which lock the entire balance for a single event cannot effectively process multiple concurrent transactions.

The vendor wants to do everything possible to prevent a subscriber from incurring a credit balance. Subscribers want to be able to utilize their mobile devices to accomplish more and more functionality. The invention of the present application provides these benefits.

SUMMARY OF THE INVENTION

The invention of this application comprises a system and method for determining an account's available funds prior to processing a billing event, reserving discrete amounts of the account's available funds, monitoring the billing event until the reservation amount is depleted and then requesting additional reservation amounts as needed. If the current reservation amount exceeds the account's available funds, the system has the ability to calculate/choose a lower reservation amount or stop a call in progress (mid-call tear down) and prevent a subscriber from exceeding their current balance. The system and method further allows users to simultaneously/concurrently transact multiple billing events (i.e., a subscriber may download a file from the Internet via their mobile device while carrying on a telephone conversation with a business associate). The invention of this application provides the benefits described in the background by providing a method for reservation-based prepaid billing, an architecture for practicing reservation-based prepaid billing, and computer logic coded on a computer-readable medium for implementing reservation-based prepaid billing.

The Method

A computerized method for processing prepaid events comprises determining a reservation amount for an event and determining whether an Available Balance of an account associated with the event is sufficient to allow the processing of the reservation amount. If the Available Balance will allow the processing of the reservation amount, the method includes processing the event and tracking the event against the reservation amount until the event terminates or the reservation amount reaches a predetermined minimum. Generally, the Network Element will conduct such tracking. Then, the method includes completing the processing of the event. In general, the Available Balance will not be sufficient to process the reservation amount if the Available Balance is less than the reservation amount determined for the event. Depending on the account involved, however, the method may allow processing so long as the Available Balance is within a certain tolerance of the determined reservation amount or according to alternate criteria.

As the prepaid event is tracked, the reservation amount is depleted as charges accumulate for the event. This ensures that the Account Balance is not overrun by unexpected charges while the event is in process. Even more sophistication is introduced with the ability to request/receive continuations.

As tracking proceeds, if the amount reserved reaches a predetermined minimum, the method includes requesting/receiving and processing an additional reservation amount. The Network Element then tracks the event against the additional reservation amount until the event terminates or the additional reservation amount reaches a predetermined minimum. These two steps ("requesting an additional reservation amount" step and the "tracking the event against the additional reservation amount" step) are repeated until the event terminates or until the Available Balance is no longer sufficient to process the additional reservation amount. In general, the predetermined minimum will be the lowest amount which will allow/support the processing of one Unit of Measurement, (i.e., minutes for duration based rating and bytes for volume based rating) for the event. This predetermined minimum, however, may be otherwise defined by the enterprise or by the rating system.

Another advantage of the prepaid reservation-based rating system is that it allows multiple events to be transacted concurrently. Because the entire balance is not reserved (unless necessary) for a given event, the method allows for the processing of additional reservations for additional events. Therefore the computerized method comprises concurrently processing at least one other event.

The method may determine a reservation amount for an event in at least two different ways. First a reservation amount may be defined by the enterprise. The method is triggered by receiving an initiation message, for the event, encoded with the event-type. The method may retrieve the reservation amount from a cache preconfigured according to the enterprise's specifications. Alternatively, the reservation amount for the event may be contemporaneously calculated by the method. Alternative embodiments may code the reservation amount in the initiation message.

Calculating a reservation amount for an event may comprise the following steps. First, the method involves retrieving a set of event parameters (event parameters may optionally include event type, event time, event date, event location, subscriber/account identification, etc. or some combination thereof) from the initiation message or a preconfigured database. Next, the system determines a Unit of Measurement associated with the event type (i.e., bytes). This information may be stored or encoded on the initiation message or a preconfigured database. Next the minimum number of said Unit of Measurement desired to process the event type are passed to the reservation amount. For instance, if the event is a voice-based phone call, the applicable Unit of Measurement would be minutes and the minimum number of such Unit of Measurement may be defined as three (3) minutes. The particular values chosen are related to the business interests of the particular enterprise involved.

A preferred embodiment comprises an additional layer of accuracy by re-rating the entire event for each continuation and termination. When processing the event, the method involves generating an Event Record for the reservation amount determined. With each continuation request, the prior reservation/Event Record is reversed and a new reservation request is generated representing both the already expended value of the prior reservation and the unused value of the additional reservation amount. This way if the rating variables change mid-event and the reservation-based rating of the event is inaccurate, such inaccuracies are corrected by reprocessing the event each time a continuation request is processed.

For instance, one embodiment of the invention comprises a method for processing prepaid events comprising determining a reservation amount for an event and determining whether an Available Balance of an account associated with the event is sufficient to allow the processing of the reservation amount. If the Available Balance will allow the processing of the reservation amount, the method includes processing the event. The processing step further includes the steps of generating an Event Record for the reservation amount. Then the method involves tracking the event against the reservation amount until the event terminates or the reservation amount reaches a predetermined minimum. If the prior reservation amount reaches a predetermined minimum, an additional reservation amount is requested. If approved, the prior reservation is backed out and a new reservation amount is assigned a value equal to the combined additional reservation amount and the prior reservation amount. A new Event Record for the new reservation amount may then be generated. The event is tracked against the new reservation amount until the event terminates or the new reservation amount reaches a predetermined minimum. These steps (reversing step through the repeating step) are repeated until the event terminates or the Available Balance is no longer sufficient to process the additional reservation amount/request. Once the event terminates or the Available Balance is no longer sufficient to process additional reservations, the method involves completing processing of the event.

This method introduces more accuracy because it is possible that the cost generated from actually rating the event may exceed the cost predetermined by the reservation rating. By backing out the prior reservation and generating a new reservation, which includes the elapsed portion of the event and the additional reservation amount, greater accuracy is ensured.

The Apparatus

The invention further comprises an architecture for practicing reservation-based prepaid billing. A system for processing prepaid events comprises a processor programmed to process the reservation request in response to a message from a Network Element, access an account associated with the event, determine a reservation amount, determine whether an Available Balance associated with the account is sufficient to allow processing of the reservation amount and complete processing of the event. If the Available Balance is sufficient to allow the processing of the reservation amount and the event has not been terminated, the processor sends a message to the Network Element from which the request originated indicating whether the event may proceed and, if so, for what reservation amount, (more specifically, whether the requested amount or a reduced amount is approved). The Network Element tracks the event against the reservation amount until the reservation amount reaches a predetermined minimum, the Network Element requests additional reservation amounts and tracks the event against the additional reservation amounts until the Available Balance is no longer sufficient to allow processing of the additional reservation amounts. Once the Available Balance is exhausted, the processor completes processing of the event by sending a message refusing additional reservations to the Network Element and the Network Element completes processing of the event.

Another example of a system for processing prepaid events may comprise an intelligent server (Network Element), a Gateway, a router and a processor. The Network Element / intelligent server receives an event, generates a reservation request or an initiation message for the event, and sends the reservation request to a Gateway. The Gateway formats the reservation request (i.e., BIR format), and sends the reservation request to a router. The router sends the reservation request to a processor. The router further monitors the load on the various processors to maximize the efficiency of the system (load balancing scheme). Finally, the processor is programmed to access an account associated with an event; determine a reservation amount; determine whether an Available Balance associated with the account is sufficient to allow processing of the reservation amount and, if the event has not been terminated, process the event. Processing the event includes sending one or more messages regarding such processing to the Network Element via the Gateway. The Network Element tracks the event against the reservation amount until the reservation amount reaches a predetermined minimum, then the Network Element may request additional reservation amounts (which are processed by the processor) and the Network Element tracks the event against the additional reservation amounts until the Available Balance is no longer sufficient to allow processing of the additional reservation amounts. The system completes processing of the event. In the preferred embodiment, the processor should be configured to concurrently process at least one other event.

In a preferred embodiment, all of the elements of the system (Network Element, Gateway, Router, Processor) may be multiplied to scale a given embodiment of the invention to handle a greater number of events/subscribers/activity and thereby produce a more efficient system.

Computer Readable Medium

The invention further includes computer logic coded on a computer-readable medium for implementing prepaid reservation-based billing. Specifically, a computer-readable medium having computer-executable instructions for performing this method comprises receiving a reservation request, accessing an account associated with an event, determining a reservation amount for the event, determining whether an Available Balance associated with the account is sufficient to allow processing of the reservation amount, and completing processing of the event. Typically, a reservation request will be made according to a particular Unit of Measurement (i.e., bytes or minutes) rather than a monetary value. If the Available Balance is sufficient to allow processing of the reservation amount, the logic sends a message to the network indicating that the event for a specific reservation amount may proceed. The logic may also facilitate additional reservation requests until the Available Balance is no longer sufficient to allow processing of the additional reservation amounts.

BRIEF DESCRIPTION OF THE DRAWINGS

The accompanying drawing incorporated in and forming part of the specification illustrates several aspects of the present invention. In the drawings:

FIG. 1 illustrates an exemplary architecture for the current invention.

For the purpose of promoting an understanding of the principles of the invention, reference will now be made in detail to the present exemplary embodiments of the invention, examples of which are illustrated in the accompanying drawing. Specific language will be used to describe the same. It will nevertheless be understood that no limitation of the scope of the invention is thereby intended toward such alterations and further modifications in the illustrated device and such further applications of the principles of the invention as illustrated therein as would normally occur to one skilled in the art to which the invention relates.

DETAILED DESCRIPTION OF THE INVENTION

Definition of Terms
  Available Balance—For a prepaid account, the Account Balance minus any amount that has been reserved for an event in progress.
  BIR—Billing Interface Record
  BLOB—A binary large object is a large file that must be handled (for example, uploaded, downloaded, or stored in a database) in a special way because of its size.
  Event Record—Any record which records an event; it includes but is not limited to CDRs (Call Detail Record).
  Socket-Based Messaging Facilitator (SBMF): Sockets are a method for communication between a client program and a server program in a network generally via TCP/IP. In this case, the SBMF allows the Gateway to communicate with a Router by specifying a service name and using a common messaging structure.
  Flat File—A flat file is a file comprising records that have no structured interrelationship.
  Mid-call tear down—A process configured to end an in-progress call when the account runs out of money or the enterprise otherwise determines to do so.
  Gateway: A gateway is a network point that acts as an entrance to another network. A gateway is often associated with both a router, which knows where to direct a given packet of data that arrives at the gateway, and a switch/Network Element, which furnishes the actual path in and out of the gateway for a given packet.
  Network Element—For purposes of this invention, Network Elements are the equivalent of service nodes (SNs or SN/IPs) and service control points (SCPs), signal transfer points (STPs), signal switching points (SSPs), and other intelligent database servers that interface with switches/elements in an intelligent network to providing call handling instructions for the switch or other Network Elements.
  Prepaid—A solution by which the subscriber pays the enterprise prior to using the service.
  SessionID: This variable, preferably assigned by the originating Network Element, uniquely identifies the event and the originating Network Element.
  SMS—Short Message Service
  SSR—Service Setup Response
  Switch—A network device that selects a path or circuit for sending a unit of data to its next destination.

This invention addresses the issues, discussed above, with real time prepaid rating including preventing the exceeding of Available Balances and processing concurrent events. To help ensure that activities do not exceed a prepaid subscriber's balance, prepaid systems rate events prior to allowing/processing the event to determine if a sufficient balance is available to pay for the event (balance verification). An exemplary embodiment of the invention uses caching to achieve very high volumes (95% of all calls within 100 milliseconds and 98% of all calls within 150 milliseconds). An exemplary embodiment of the system will also support over 10 million subscribers and facilitate approximately eighteen million call attempts and termination messages per day. The invention, however, may be scaled to service any size subscriber base or activity flow.

In an exemplary embodiment, a portion of an account's balance will be 'reserved' when an event is approved by the system. The Available Balance will be decremented by the reservation amount until the event is complete. Following event completion, the event may be re-rated and the Available Balance will be adjusted based on this final calculation. In an exemplary embodiment, caching is used to support faster response times for the event approval. An exemplary design of the system may use three or more caches: a Guiding Cache, an Account Balance Cache and the Account Reservation Cache. Another embodiment may use a fourth cache called Subscription Cache. The Subscription Cache may store the services and other special information about an account's configuration. In alternative embodiments, one or more of these caches may be combined or eliminated.

Event Records are, preferably, not committed until event completion/termination. Furthermore, an exemplary embodiment provides interface points to support the committing and rolling back of charges (i.e., a dropped call or other reversal of charges) to the Available Balance for the processing of additional reservation requests, credits, and free units.

An exemplary embodiment of the invention also concurrently processes multiple events for the same subscriber account (e.g., a voice call and a MP3 download) by reserving only portions of the entire Available Balance (the entire balance is not reserved for an event except where the entire Available Balance is necessary to achieve an event allowance). This allows subsequent reservations for another event to be concurrently processed.

Referring to FIG. 1, a diagram illustrates an exemplary system architecture to practice the invention. An event flow through this architecture (10) would comprise the following. A subscriber may initiate an event (including phone calls, downloads, pages, surfing, e-mail, purchases, and more). A Network Element/switch (100) located on the network (10) intercepts the event and generates a message comprising information regarding the event. The switch may send the information regarding the event to the Network Element. Therefore, the Network Element message may include the type of event and an identifier for the customer account so that the system may determine an appropriate reservation amount based on predetermined criteria. The Network Element (100) sends asynchronous call setup, event continuation, or event completion messages to a Gateway (200) (1). The Gateway (200) receives the request from the Network Element (100) and formats the message into an appropriate format, such as Billing Interface Record (BIR) format. The Gateway (200) sends it to its SBMF (250) via a socket connection. (2) The SBMF (250) enqueues the request internally. It sends the requests to a router (300) when the router (300) requests the message. (3) Certain hardware and network adjustments may be necessary to provide the necessary communication between the Network Element (100) and Gateway (200). All such technical modifications are within the ordinary skill of the art.

In an exemplary embodiment, the system should be designed to support rating for three types of subscriber accounts: reservation-based prepaid, non-reservation based prepaid (post-call prepaid), and/or post-call. The router (300) sends the request to the appropriate SBMF (350) via a socket connection (5). The SBMF (350) enqueues the request internally. It (350) sends the requests to a processor/rating engine (400) when the processor/rating engine (400) requests another message from SBMF (350) (6). The rating engine (400) reads the request from the SBMF (350), processes it, and sends the response back to a SBMF (600) with the appropriate identifiers so that the response may eventually be delivered to the appropriate Network Element. The message from the Gateway (200) (7) contains the SBMF domain (600) to route the request back to. If sufficient Available Balance exists, the event is processed and the Available Balance is reduced by the reservation amount. The "meter" runs on the reservation amount, at the Network Element, until an event termination or an event continuation message is generated and processed by the system. If subsequent reservations are requested but not available, the event is torn down.

The SBMF (600) enqueues the response internally. It sends the response to the Gateway (200) when the Gateway (200) requests the response (8). The Gateway (200) formats the SSR from the Rating Engine (400) into the Network Element's response format and sends the formatted SSR to the Network Element (100) that originally generated the initiation message (9). Whenever an event is completed or torn down, the Available Balance is updated (10) with any unused portion of the reservation amount.

In another exemplary embodiment of the invention, the following system components, processes, and logic interact to produce the benefits of the invention.

Event Setup

In an exemplary embodiment, the system is configured to accept an event setup request or initiation message. Initiation messages may also be received during an event, for example, at the start of the second leg of a three-way call. A switch within the system receives an event. The switch may be associated with another Network Element. Either the switch or the Network Element will uniquely identify the event by incorporating a SessionID (preferably type long) and ElementID (preferably type char) in the event initiation message.

In one exemplary embodiment, the event initiation message may be configured to comprise an indicator of the event type. The event initiation message does not typically include other parameters, such as a reservation scheme (comprising multiple reservation amounts arranged in a preferred order) and/or a reservation direction indicator (indicating a direction—greater or less than—an initial preferred reservation amount may be subsequently modified to achieve a more optimal reservation). The rating engine is pre-provisioned with these parameters based on predetermined criteria (i.e., type of event, Available Balance, et cetera).

The Network Element may send the event initiation message to a Gateway to be formatted into a preferred record format, preferably BIR format. The event may also include event date, event time, event volume, and event duration information.

The Gateway will forward the BIR to a router for further processing. In an exemplary embodiment, the router will access the subscriber's account number via a cache (Guiding Cache) to determine the correct rating process for that account and event combination. The router may use a key (i.e., last two digits of account number) to determine which type of subscriber account is associated with the event so that it can be correctly processed.

Router Guiding Cache

The Router may be configured to examine the BIRs and route them from the Gateway s to the appropriate rating process by referencing the Guiding Cache. In an exemplary embodiment, this is accomplished by querying a Guiding Cache comprising account numbers and their associated account types and keys (some customer identifier such as e-mail address, phone number, etc.). Additional caches may be configured to comprise other subscriber/account identifying information. In an exemplary embodiment, the query is performed using the event type and a key (such as the customer's e-mail address, phone number, etc.) to get the account number which is then input into the BIR. The query will determine which rating process should be utilized to determine if the system should allow an event. The account type and other subscriber-identifying information may be appended to the BIR prior to further processing. Other identifying fields include Account Number, Subscription Id, Effective Date, Expiration Date, International Mobile Subscriber Identity, Mobile Station Integrated Services Digital Network, User Id (i.e. for Internet login), and Domain Name (Refers to SBMF Domain Name/Id). When Available Balances are updated for a given account, the routing mechanism will use part of the account number to separate transactions. This will allow the system to scale as more accounts are added and more machines are needed to handle processing because events are routed based on account number.

SBMFs may bridge the Gateway, the Router, and the rating processes. The Router may be configured to receive BIRs from specific SBMFs but transmit messages to any SBMF that interfaces with the system.

Rating Engine

Reservation Based Prepaid Rating Engine Startup

In an exemplary embodiment, one or more rating engine processes connect to a SBMF interface between the Router and the Rating Engine. These processes pull messages from the Router according to their capacity. The Rating Engine will load certain database tables which specify preconfigured enterprise variables relating to specific events or accounts. The Rating Engine will preferably create an object (as used in object-oriented programming) for processing an event (Event Object). Finally, the rating engine will initialize an Account Balance cache and the Account Reservation cache.

Reservation Rating

On event initiation, the event is rated, according to algorithms coded in systems known to those of ordinary skill in the art. The cost of the rating is stored in the Usage Cache and in an Event Record.

The event is not committed or stored in the master database until a termination message is received. Therefore, the rating system must backout the current reservation and rerate the event when either a call continuation or call termination is received. In one possible embodiment the backout may be accomplished through the use of a cookie. A cookie is an object or information, which is stored in memory, for future use. The cookie may comprise information similar to that comprising the Event Record or information that is the negative of the Event Record.

The Rating Engine pulls the originating and terminating parameters for each event and the subscriber's attributes to calculate the maximum event size for the subscriber. The Rating Engine will access the Account Balance Cache and the Reservation Cache to determine the Available Balance (Available Balance may be provided as either a total amount available or only a reservation amount available). Its primary use is to enable the Rating Engine to determine if a reservation request is supported by the Available Balance. The Rating Engine will determine if the incoming event can proceed and for how long. To process the calculation, the Rating Engine will either use the preferred reservation parameters provided by the enterprise in a preconfigured database or it will calculate reservation parameters based on certain attributes of the event including event type, account number, and more. The Rating Engine will also consider factors such as whether any account thresholds have been crossed. If the requested reservation cannot be processed, the Rating Engine will find the maximum allowable/preferable duration, if any, for the Available Balance. If the event is permitted to proceed, the cost will be recorded in the Usage Cache but not committed until event termination.

The Account Balance Cache, in conjunction with the Account Reservation Cache will determine if an event may continue by comparing the balance currently available for this account against the cost of the current event. Once a user attempts an event, a pre-defined or calculated event cost will be rated. This cost is compared to the Available Balance. If the cost is greater than the Available Balance then the system will determine if the reservation request can be scaled down to allow for a lower cost that can be covered by the Available Balance. If it is determined there is sufficient balance to allow the event to be placed (Balance—Reservation Amount>=0), the cost of the event will be added to the reservation amount field in the Account Balance cache and a record will be created in the Reservation cache whose fields include the cost of the event (in the reservation amount field) along with a unique transaction id for the event.

Once an event completion record is received, the complete Event Record will be rerated. This final cost will be subtracted from the original reservation to determine if some of the reservation must be returned to the Available Balance in the Reservation Cache. The Account Balance and the Usage Cache will be updated accordingly. The Reservation Cache will contain a list of Event Record entries. The SessionID of the event and ElementID will uniquely identify each Event Record for purposes of adjustment and rollback/backout on receipt of a termination message or if the event aborts. This Reservation Cache is also used to store attributes of in-progress events. An in-progress event is defined as one that has not received a termination message. Event Records stored in the Reservation Cache may include the account number (type long) for the event charges; reservation amount (type double)—balance currently reserved for a given event; Reservation Quantity (long)—the total Units of Measurement/duration reserved for the event; the starting reservation quantity (long); type of rating Units of Measurement (char); prepaid subscription ID; event creation date/time; last updated date/time—this may be used for error recovery, i.e., to determine if an event has been outstanding too long without a termination event; and any additional parameters that may be necessary to permit a rollback of the pseudo record.

Once the Rating Engine completes an initial rating of the event, it sends the Gateway a message (SSR) that either approves or denies the event. The Gateway conditions the message (SSR) into a format that can be read by the Network Element. Using various identifying factors, the Gateway sends the message (SSR) to the originating Network Element.

Rating of Request

An architecture that uses a 32 bit address space should preferably reserve 2.5 GB of address space for storage of data for all caches which will be accessed by a given process. There exists the capability to partition the Guiding Cache as needed to efficiently support any number of Accounts. The Rating Engine will access the Account Balance Cache, the Reservation Cache, the Usage Cache, therefore, the combined size of the caches should preferably not exceed the preferred reserved address space. This exemplary embodiment assumes that no more than 20% of subscribers will have events concurrently in progress on average.

In an exemplary embodiment, the system will comprise computer executable instructions to initiate a reservation based prepaid event. The computer executable instructions may exist on any kind of computer memory including floppy disks, hard disks, CD-ROMS, Flash ROMS, nonvolatile ROM, RAM and equivalents thereof. One exemplary embodiment includes the following logic:

---

Initialize Event Duration = 0 and Next Continuation Flag = FALSE
Call the Initialize & Extract Event Information( ) function of the Event Object and pass this function the BIR Record.
Retrieve the Account Number, Subscription Identification, Event Type, and Unit of Measurement [aka BIR Fields] from the Event Object. Preferably, the logic should be modularized and a separate function should be used for obtain each piece of data.
Using the Account Number access the Account Balance Cache.

-continued

```
If the record is not found:
        Read the Account Balance from the database
Calculate the Available Balance = Account Balance − Reservation Amount
Check for and process Free Units
Determine the Reservation Duration (i.e. a data event may be volume rated (bytes) or
duration rated (seconds))
        Calculate or Retrieve the largest Reservation Duration (cached Reservation Table)
        based on the Event Type retrieved from the input BIR Record (i.e. 600 seconds
        for voice BIR).
Call the Process Event for Initiation( ) function of the Event Object passing the list of
(Reservation Durations and BIR Fields retrieved from the Reservation Table)
    If the Process Event for Initiation( ) = SUCCESS
            Retrieve the Cost of the Event from the Event Object
            If Cost of the Event is greater than the Available Balance, determine if
            there are any old Reservations that need to be deleted (did not receive
            termination records for ... this will increase the Available Balance)
                    If (Account Balance − Reservation Amount) > 0
                            Read the Reservation Cache with the Account Number
                            If any entries are older (using Event Date and/or Event
                            Time) than Reservation Time Limit.
                                    Update the Reservation Amount in the Account
                                    Balance Cache and the Reservation Cache
                                    Recalculate the Available Balance. Available Balance
                                    = Balance − Reservation Amount
            If Cost of the Event is less than or equal to the Available Balance, the
            event may proceed.
                    Set Event Duration = Reservation Duration
                    Set Next Continuation Flag to TRUE
                    Determine if there is a more optimal Reservation Duration based
                    on the Event Type. Reservation Quantity must be greater than the
                    previous Reservation Duration. Set Reservation Duration =
                    Reservation Quantity.
            Else if Cost of the Event is greater than Available Balance, determine
            the next lowest Reservation Duration (Event Duration has not been
            set)
                    Retrieve the smallest Reservation Duration (cached
                    Reservation Table) based on Event Type (i.e., 30 seconds for
                    voice BIR Record).
                    New Reservation Duration must be less than the previous
                    Reservation Duration.
            Loop to find most optimal reservation.
    End loop
If SUCCESS
        If the Event Duration has been set (greater than zero)
            Retrieve the Unit Type from the Event Object
            Insert a row into the Reservation Cache for the unique event SessionID
            and ElementID. Set the Account Number and Subscription Identification.
            Set the Reservation Amount to the Cost of the Event. Set the Reservation
            Quantity to the Duration of the Event. Set the Event Date and Event
            Time.
            If the Cost of the Event is greater than zero
                    Update the Account Balance Cache. Increment the Reservation
                    Amount by the Cost of the Event.
                    Access the Calculate Threshold Crossing( ) function of the Balance
                    Threshold Object to determine which prepaid thresholds have been
                    crossed (WHISPER messages)
                    For each Balance Limit Threshold Object returned
                            Update the Account Balance Cache with the last threshold
                            crossed.
                            Set Response Message = Whisper Message ID and time to
                            play message.
                                    Example: 20 dollar threshold − 30 dollars available
                                    before call − 12 dollar event cost = 2 - indicates
                                    crossing the threshold by 2 dollars. Duration of the
                                    Event = 600 seconds. (2/12) * 600 = 60 - indicates
                                    to the Network Element to play the message with 60
                                    seconds left in the Event.
Set Response Message = Event Duration (Unit of Measurement), Unit Amount Type and
Next Continuation Flag and return back to the Gateway
```

Further Processing

The Rating Engine will preferably support at least three message types:

Initiation Messages; Continuation Messages (Reservation-based approach); and Termination Messages. Event Initiation, Continuation and Termination messages all preferably comprise the following information:

The SBMF domain to route the request back to. This is the SBMF domain that originally received the request from the Gateway.

Header record from the Gateway. The header record may comprise the following information: Event Type, Account Number, Subscription Id, Effective Date, Expiration Date, International Mobile Subscriber Identity, Mobile Station Integrated Services Digital Network, User Id (i.e. for Internet login), and Domain Name (Refers to SBMF Domain Name/Id).

The unique id of the event based on SessionID of the event and ElementID.

Gateway sequence number

Gateway date and time

BIR Record comprises information used for rating. Each BIR Record could be different depending on the event that is being rated. The Rating Engine uses the following information from the BIR record (This is not a complete list):

Account number, subscription id, event code (used to determine the reservation amount and reservation units). Network Element Reservation request amount and units (minutes, bytes, etc.). If not supplied, the Rating Engine will determine this information and send it back in the Response record. These values are typically not used for Termination messages.

If the prepaid subscriber has a price plan that supports free minutes, the billing system will take into account these free minutes while calculating the Available Balance for the subscriber.

Continuations

An exemplary embodiment of the invention accepts continuation requests (i.e. subsequent reservations). The continuation request triggers new event record comprising the current duration and a new reservation amount. The rating engine backs out the previous reservation and then rates the new event record. Rating of the continuation request mimics the rating of an initial reservation as described above. The rating engine then updates the Available Balance. Event continuation and event termination scenarios may require a rollback of the rating residual contained in various data structures and caches. An application programming interface may be designed by one of ordinary skill in the art to accomplish this functionality.

In an exemplary embodiment, the system will comprise computer executable instructions to process a continuation request for a reservation based prepaid event. One exemplary embodiment includes the following logic:

```
Initialize Event Duration = 0 and Next Continuation Flag = FALSE
Call the Initialize and Extract Event Information( ) function of the Event Object passing
the BIR Record
Retrieve the Account Number, Subscription Identification and Event Type from the
Event Object (via the Get Account Number( ), Get Subscription Identification( ) and Get
Event Type( ) functions)
Using the Account Number access the Account Balance Cache entry.
If the record is not found
    Read the Account Balance from the database
Calculate the Available Balance = Account Balance – Reservation Amount
If Free Minutes with Zero Balance environment variable is set to 'N' and the Available
Balance <= 0.0 (debit balance), do not allow the call to continue
    Return Event Duration = 0 and Next Continuation Flag = FALSE to the Gateway
Using the event SessionID and ElementID, access the Reservation cache entry.
    The Reservation Table must be accessed to determine the Reservation Quantity.
    Insert a row into the Reservation Cache for the unique event SessionID and
    ElementID. Set the Account Number and Subscription Identification. Set the
    Reservation Amount = 0 and the Usage Information = NULL.
Determine the Reservation Duration
    If Available Balance is less than or equal to a defined value (i.e. Low Balance
    Amount, retrieve the smallest Reservation Duration based on Event Type
    retrieved from the input BIR Record (i.e. 30 seconds for voice BIR).
    Set New Reservation Duration = initial Reservation Duration + new requested
    Reservation Duration.
Call ProcessEventForContinuation( ) function of the Event Object passing the Reservation
Duration.
If the ProcessEventForContinuation( ) function = SUCCESS
    Retrieve the Cost of the Event from the Event Object
    If Cost of the Event is less than or equal to the Available Balance, the Event may
    proceed.
        Set Event Duration equal to the Reservation Duration
        Set Next Continuation Field to TRUE
    Else, determine the next lowest Reservation Duration (Event Duration has not
    been set)
            Retrieve the value (cached Reservation Table) based on the Event Type,
            new Reservation Duration must be less than the previous Reservation
            Duration.
            Set Reservation Duration.
    Loop to try to find the most optimal reservation
If SUCCESS
    If the Event Duration has been set (greater than zero)
        Retrieve the Unit Amount Type from the Event Object
        Update the row in the Reservation Cache for the unique event SessionID
        and ElementID. Set the Reservation Amount to the Cost of the Event.
```

-continued

```
Increment the Reservation Quantity by the Duration of the Event. Set the
Event Date and Event Time.
If the Cost of the Event is greater than zero
    Update the Account Balance Cache. Increment the Reservation
    Amount by the Cost of the Event. This includes subtracting the old
    Reservation Amount from the Reservation Cache.
        Access the Calculate Threshold Crossing( ) function of the Balance
        Threshold Object to determine which prepaid thresholds have been
        crossed (WHISPER messages)
        For each Balance Limit Threshold Object returned
            Set Response Message = Whisper Message ID and
            ((Threshold Crossed – Available Balance – Cost of the
            Event) / Cost of the Event) * Duration of the Event
                Example: 20 dollar threshold – 30 dollars available
                before call – 12 dollar event cost = 2 - indicates
                crossing the threshold by 2 dollars. Duration of the
                Event= 600 seconds. (2 / 12) * 600 = 60 - indicates
                to the Network Element to play the message with 60
                seconds left in the event.
Else set Response Message: Event Duration (Unit Amount), Unit of Measurement and
Next Continuation Flag and return back to the Gateway
```

Triggers

An exemplary embodiment of the invention will also notify the Network Element to trigger a Whisper Message to the subscriber/subscriber prior to event setup to indicate how much balance is available to complete the event. This may be accomplished by setting certain flags in the SSR which indicate the type of balance limit (type varchar) that is imposed by a threshold (credit imposed balance limit, prepaid billing limit, and courtesy balance alerts); threshold identifications (type varchar) (indicating which threshold has been crossed and how the system should react such as SMS initiation, whisper message, and account hotlines); threshold percentage/amount deviation (type number or varchar) permitted before a restriction limit crosses its threshold; threshold calculation indicators (type varchar) which indicate the type of calculation to perform on a restriction limit to determine the threshold (whether it is a fixed dollar or percentage based threshold); and threshold accuracy indicator, which indicates how accurate the balance must be before a threshold action is performed so that an account does not receive erroneous processing.

Concurrent Events

An exemplary embodiment of the invention permits the initiation of a concurrent event. Because only a portion of the Available Balance is reserved for an event, additional reservations may be processed for concurrent, different events. This will also support multi-user accounts where more than one subscriber is initiating events at the same time.

Event Termination

Whenever an event is completed or torn down, the billing system will preferably receive a Service Completion Record from the Network Element. This signals the billing system that the event is complete and that the Available Balance and various caches may be updated and committed.

The billing system will provide the ability to accept the event completion record. On call termination, the backout cookie for the prior call initiation or call continuation is provided along with an event record with the full duration of the event from the event initiation (the Network Element preferably provides the end date and time of the event on termination messages). The system will receive event termination messages from the Network Element for all events initiated by the Network Element. This includes dropped calls and busy calls (subscriber dials number, Network Element verifies balance, called number is busy). The system will receive an event termination message at the end of the second leg of a three-way call. If an event termination is never received, then the appropriate caches are released and the event is not billed according to techniques known in the art.

Once the Service Termination message is received for the event, the complete event is rerated. On completion of rating this event the event record is submitted for storage along with updates to the various balance tables and summary records including Available Balance.

Although postpaid systems may process records in a batch, prepaid records are preferably processed as soon as they are acquired. In an exemplary embodiment, a record is written in a flat file immediately after it has been processed. Then a BLOB creator reads the record, categorizes it by partition, creates a BLOB file and dispatches the record for further downstream processing according to methods that are commercially available and known in the art.

A special case occurs when an event is canceled. If an event is canceled (where a reservation is requested but the event never starts, i.e., if a subscriber dials a wrong number, receives a busy signal, or some other error occurs), the event may be rated as an event of zero duration.

In an exemplary embodiment, the system will comprise computer executable instructions to process a termination request for a reservation based prepaid event. One exemplary embodiment includes the following logic:

Call the Initialize and Extract Event Information( ) function of the Event Object passing the BIR Record Retrieve the Account Number and Subscription Identification from the Event Object (via the Get Account Number( ) and Get Subscription Identification( ) functions)

Using the Account Number access the Account Balance Cache entry.

If the record is not found

Read the Account Balance and create a Account Balance Record in the Account Balance Cache, including Account Number, Balance=balance from Calculate Balance( ). Reservation Amount=0.0 and Usage Amount=0.0.

Using the event SessionID and ElementID, access the Reservation Cache entry.

Call the Process Event for Termination( ) function of the Event Object passing the Usage Information (Backout Cookie) field of the Reservation Cache entry If the Process Event for Termination( ) function=SUCCESS
  Retrieve the Cost of the Event from the Event Object
  Delete the row from the Reservation Cache for the unique event SessionID and ElementID.
  If the previous Reservation Amount from the Reservation Cache is greater than zero or the Cost of the Event is greater than zero, Update the Account Balance Cache:
    Set the Reservation Amount to the Reservation Amount—previous Reservation Amount from the Reservation Cache.
    Set the Account Balance to the Account Balance—Cost of the Event
    Set the Usage Amount to the Usage Amount+Cost of the Event.
    Call the Store Event to File( ) function of the Event Object. This function will write a call record to storage so that it may be sent to the existing processes for consolidation and updating.
Else
  Return SUCCESS to the Gateway

CONCLUSION

Modifications may be made in the exemplary embodiments without departing from the spirit of the invention.

What is claimed:

1. A computerized method for processing prepaid events comprising:
   a. receiving a reservation request from an event from a network element;
   b. determining a reservation amount for said event;
   c. determining whether an available balance of a prepaid account associated with said event is sufficient to allow the processing of said reservation request;
   d. if said available balance will allow processing of said reservation request, processing said reservation request by;
      i. approving said reservation amount for the event;
      ii. reversing a prior reservation amount for said event from the prepaid account; and
      iii. reserving a new reservation amount from the prepaid account for the approved event, the new reservation amount equal to the combination of said reservation amount approved in (i) and said prior reservation amount;
   e. receiving at least one additional reservation request from said network element;
   f. repeating step "b—determining a reservation amount step" through step "e—receiving at least one additional reservation request step" until said network element sends an event termination message or said available balance is no longer sufficient to process said additional reservation requests.

2. A computerized method for processing prepaid events comprising:
   a. receiving a reservation request from an event from a network element;
   b. determining a reservation amount for said event;
   c. determining whether an available balance of a prepaid account associated with said event is sufficient to allow the processing of said reservation request;
   d. if said available balance is not sufficient, calculating/choosing a lower reservation amount for said reservation request;
   i. repeating steps "c—determining whether an available balance step" through step "d—if said available balance is not sufficient step" until said available balance is sufficient for said reservation request or said reservation amount reaches a predetermined minimum;
   e. if said available balance will allow processing of said reservation request, processing said reservation request by;
      i. approving said reservation amount for the event;
      ii. reversing a prior reservation amount for said event; and
      iii. reserving a new reservation request from the prepaid account, the new reservation request equal to the combination of said reservation amount approved in (i) and the prior reservation amount;
   f. receiving at least one additional reservation request from said network element;
   g. repeating step "b—determining a reservation amount step" through step "f—receiving at least one additional reservation request step" until said network element sends an event termination message or said available balance is no longer sufficient to process said additional reservation requests.

3. A computerized method for processing prepaid events comprising:
   a. determining a reservation amount for an event;
   b. determining whether an available balance of a prepaid account associated with said event is sufficient to allow the processing of said reservation request;
   c. if said available balance will allow the processing of said reservation request,
      i. processing said event by:
         A. approving said reservation amount for the event
         B. reversing a prior reservation amount for said event from the prepaid account; and
         C. reserving a new reservation amount from the prepaid account equal to the combination of said reservation amount approved in (i) and said prior reservation amount;
      ii. tracking said event against said reservation request until said event terminates or said reservation amount reaches a predetermined minimum;
   d. if said prior reservation amount reaches a predetermined minimum
      i. requesting an additional reservation amount for the event;
      ii. tracking said event against said additional reservation amount until said event terminates or said additional reservation amount reaches a predetermined minimum;
      iii. repeating said "requesting an additional reservation amount" step and said "tracking said event against said additional reservation amount" step until said event terminates or until said available balance is no longer sufficient to process said additional reservation amount;
   e. completing processing of said event.

4. A computerized method, as claimed in claim 1, for processing prepaid events further comprising concurrently processing at least one other event.

5. A computerized method, as claimed in claim 1, wherein said determining a reservation amount for an event comprises the following steps:
   a. receiving an initiation message for said event; and
   b. retrieving a reservation amount for said event from a preconfigured database.

6. A computerized method, as claimed in claim 1, wherein said determining a reservation amount for an event comprises the following steps:
   a. receiving an initiation message for said event; and
   b. calculating a reservation amount for said event.

7. A computerized method, as claimed in claim 6, wherein said calculating a reservation amount for said event comprises the following steps:
   a. retrieving a set of event parameters including an event type from said initiation message;
   b. determining a unit of measure associated with said event type;
   c. determining a minimum number of units necessary to process said event type; and
   d. passing said minimum number of units and unit of measure to said reservation amount.

8. A computerized method, as claimed in claim 1, wherein said approving said reservation amount step further comprises the steps of:
   a. generating a record for said reservation amount;
   b. generating a record for reversing said reservation amount; and
   c. sending an approval to said network element.

9. A computerized method for processing prepaid events comprising:
   a. determining a reservation amount for an event;
   b. determining whether an available balance of a prepaid account associated with said event is sufficient to allow the processing of said reservation amount;
   c. if said available balance will allow the processing of said reservation amount,
      i. processing said event wherein said processing step further includes the step of generating a record for said reservation amount; and
      ii. tracking said event against said reservation amount until said event terminates or said reservation amount reaches a predetermined minimum;
      iii. if said prior reservation amount reaches a predetermined minimum,
         A. reversing said prior reservation amount;
         B. requesting an additional reservation amount;
         C. assigning a new reservation amount a value equal to the combination of the prior reservation amount and the additional reservation amount from (B);
         D. generating a record comprising said new reservation amount;
         E. tracking said event against said new reservation amount until said event terminates or said new reservation amount reaches a predetermined minimum;
         F. repeating said "reversing step" (A) through said "repeating step" (F) until said event terminates or until said available balance is no longer sufficient to process said additional reservation amount;
   d. completing processing of said event.

10. A system for processing prepaid events comprising a processor programmed to
   a. receive a reservation request;
   b. access a prepaid account associated with said event;
   c. determine a reservation amount from said reservation request,
   d. determine whether an available balance associated with said account is sufficient to allow processing of said reservation request,
   e. if said available balance is sufficient to allow the processing of said reservation request and said event has not been terminated,
      i. process said event by:
         A. approving an additional reservation amount for the event;
         B. reversing a prior reservation amount for the event from the prepaid account; and
         C. reserving a new reservation amount from the prepaid account equal to the combination of the approved reservation amount approved in (A) and said prior reservation amount;
      ii. receive additional reservation requests and repeat steps (b—access an account step) through (e—if said available balance is sufficient step) until said available balance is no longer sufficient to allow processing of said additional reservation request;
   f. complete processing of said event.

11. A system for processing prepaid events comprising:
a. a network element, and
b. a processor; and
wherein said network element is operative to
i. receive an event, and
ii. generate a reservation request for said event; and
wherein said processor is programmed to
i. receive said reservation request from said network element,
ii. access a prepaid account associated with said event,
iii. choose/calculate a reservation amount from said reservation request,
iv. determine whether an available balance associated with said account is sufficient to allow processing of said reservation request,
v. if said available balance is sufficient to allow the processing of said reservation request and said event has not been terminated,
   A. process said event by:
      1. approving a reservation amount for said event;
      2. reversing any prior reservation amounts for said event from the prepaid account; and
      3. reserving a new reservation amount from the prepaid account equal to the combination of the newly approved reservation amount approved in (1) and said prior reservation;
   B. receive additional reservation requests (continuation requests) and repeat steps (ii—access a prepaid account step) through (v—if said available balance is sufficient step) until said available balance is no longer sufficient to allow processing of said additional reservation requests; and
vi. complete processing of said event.

12. A system for processing prepaid events comprising
a. a gateway, and
b. a router, and
c. a processor; and
wherein said gateway is operative to
i. receive a reservation request for an event from a network element;
ii. format said reservation request, and
iii. send said reservation request to a router; and
wherein said router is operative to
i. request said reservation request from said gateway;
ii. send said reservation request to a processor according to a load balancing scheme; and
wherein said processor is programmed to
i. access a prepaid account associated with said event;
ii. determine a reservation amount from said reservation request, iii. determine whether an available balance associated with said prepaid account is sufficient to allow processing of said reservation request,
iv. if said available balance is sufficient to allow processing of said reservation request and said event has not been terminated,
  A. process said event by:
    1. approving a reservation amount for said event;
    2. reversing any prior reservation amounts for said event from the prepaid account; and
    3. reserving a new reservation amount from the prepaid account equal to the combination of the reservation amount approved in (1) and said prior reservation amount;
  B. receive additional reservation requests and repeat steps (ii—determine a reservation amount step) through (iv—if said available balance is sufficient step) until said available balance is no longer sufficient to allow processing of said additional reservation requests,
v. complete processing of said event.

13. A system for processing prepaid events, as claimed in claim 12, wherein said processor is further programmed to concurrently process at least one other event.

14. A computer-readable medium having computer-executable instructions for performing a method comprising:
a. accessing a prepaid account associated with an event;
b. determining a reservation amount for said event;
c. determining whether an available balance associated with said account is sufficient to allow processing of said reservation request;
d. if said available balance is sufficient to allow processing of said reservation request,
  i. processing said event by:
    A. approving a reservation amount for said event;
    B. reversing a prior reservation amount for said event from the prepaid account; and
    C. reserving a new reservation amount from the prepaid account equal to the combination of the reservation amount approved in (A) and said prior reservation amount;
  ii. receiving additional reservation requests and repeating steps "a—accessing a prepaid account step" through "d—if said available balance is sufficient step" until said available balance is no longer sufficient to allow processing of said additional reservation requests;
e. completing processing of said event.

15. A computer-readable medium having computer executable instructions for performing a method comprising:
a. receiving a reservation request;
b. accessing an account associated with said reservation request;
c. determining a reservation amount for said reservation request based on an event type associated with said reservation request;
d. determining whether an available balance associated with said account is sufficient to allow said reservation request;
e. if said available balance is not sufficient, calculating/choosing a lower reservation amount for said reservation request;
f. repeating steps "d—determining whether an available balance step" through step "e—if said available balance is not sufficient step" until said available balance is sufficient for said reservation request or said reservation amount reaches a predetermined minimum;
g. said available balance is sufficient to allow processing of said reservation request:
  i. processing said reservation request by:
    A. requesting a reservation amount for said event;
    B. reversing any prior reservation amounts for said event from the prepaid account; and
    C. assigning a new reservation amount at a value equal to the combination of said reservation amount requested in (A) and said prior reservation amount;
  ii. receiving said additional reservation requests and repeating steps "b—accessing an account step" through "g—if said available balance is sufficient step" until said available balance is no longer sufficient to allow processing of said additional reservation requests.

* * * * *